April 18, 1939.   M. E. LANGE   2,154,514
MACHINE TOOL
Filed July 24, 1937   3 Sheets-Sheet 1
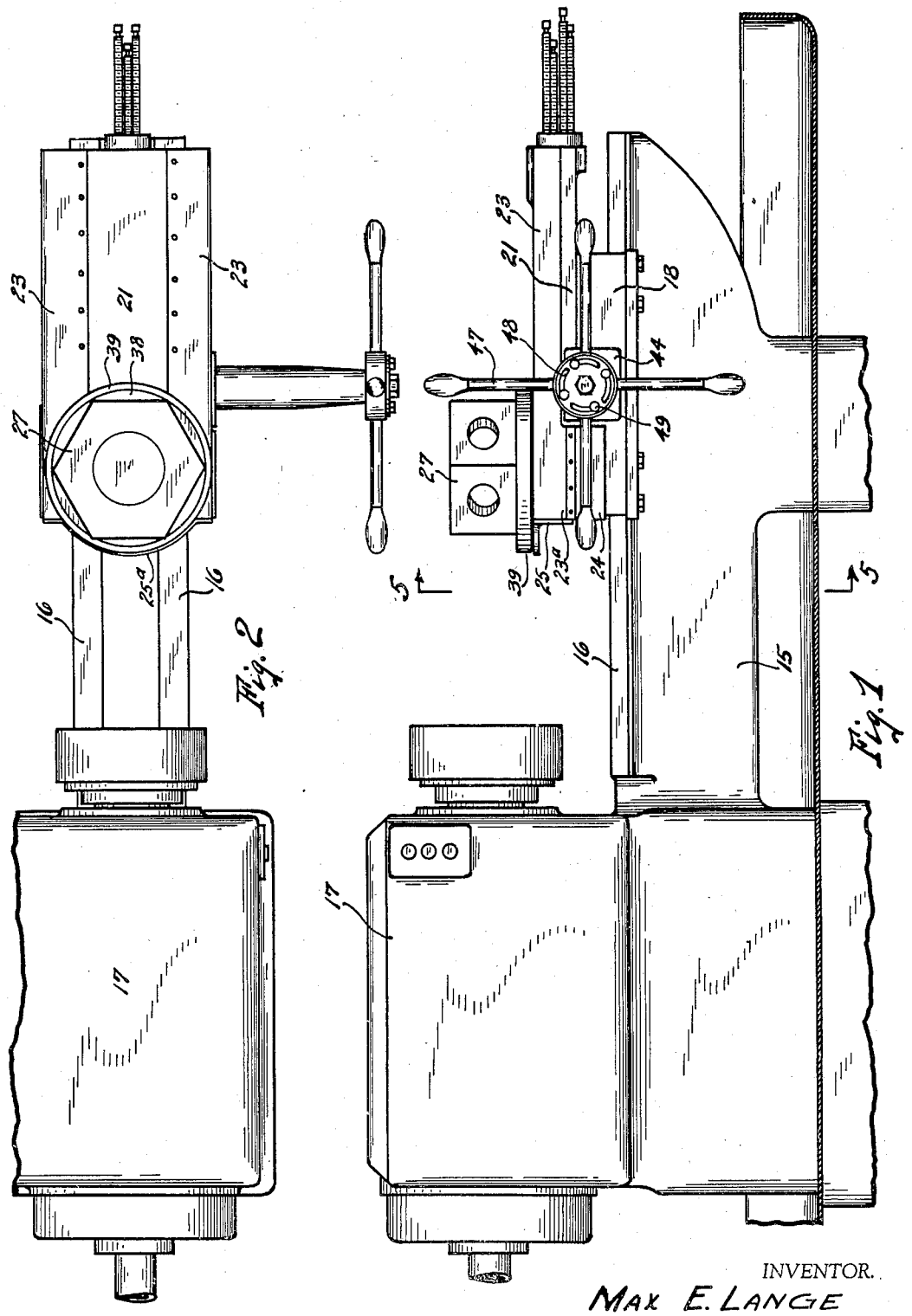
INVENTOR.
MAX E. LANGE
BY
Kwis Hudson & Kent
ATTORNEYS

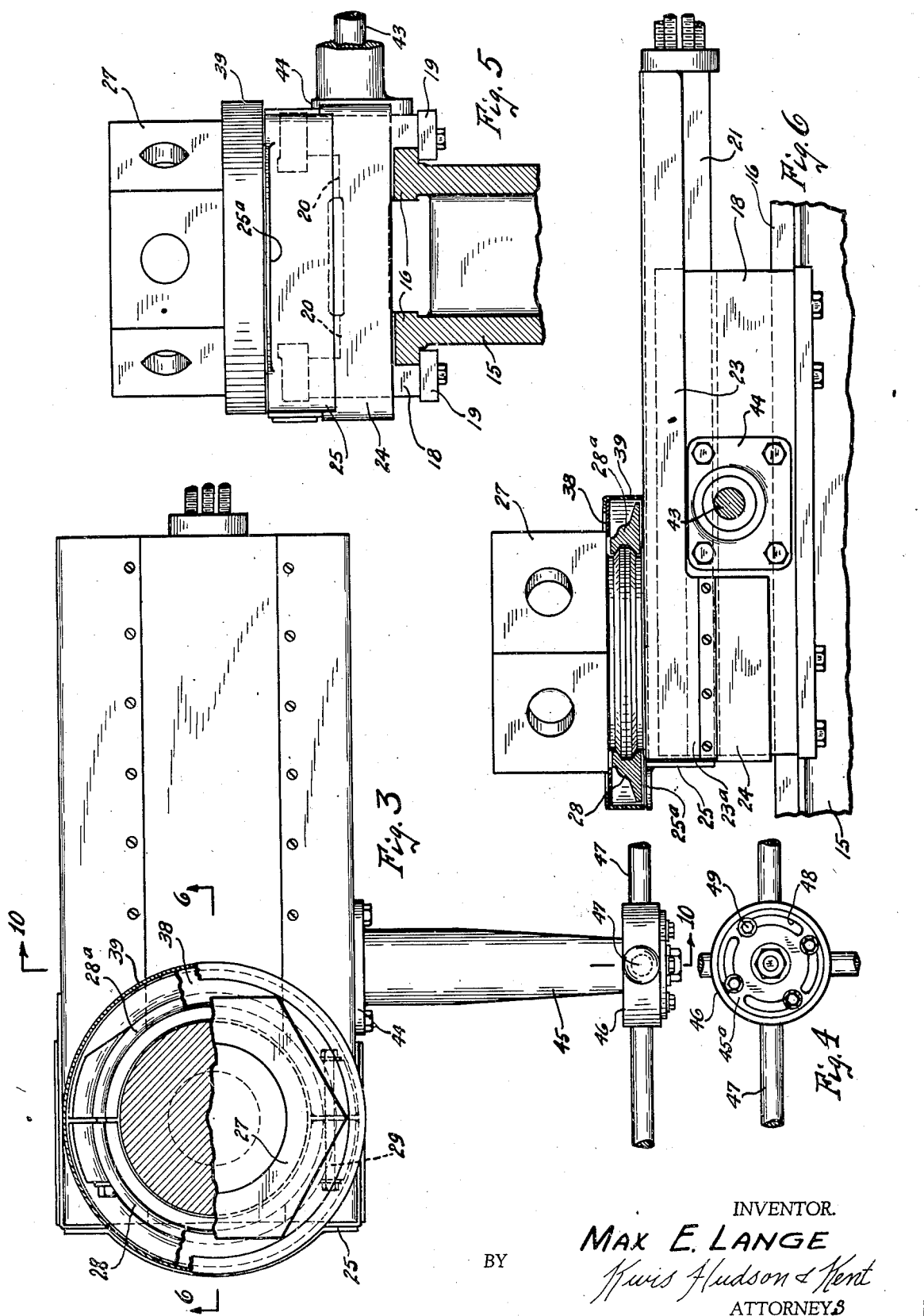

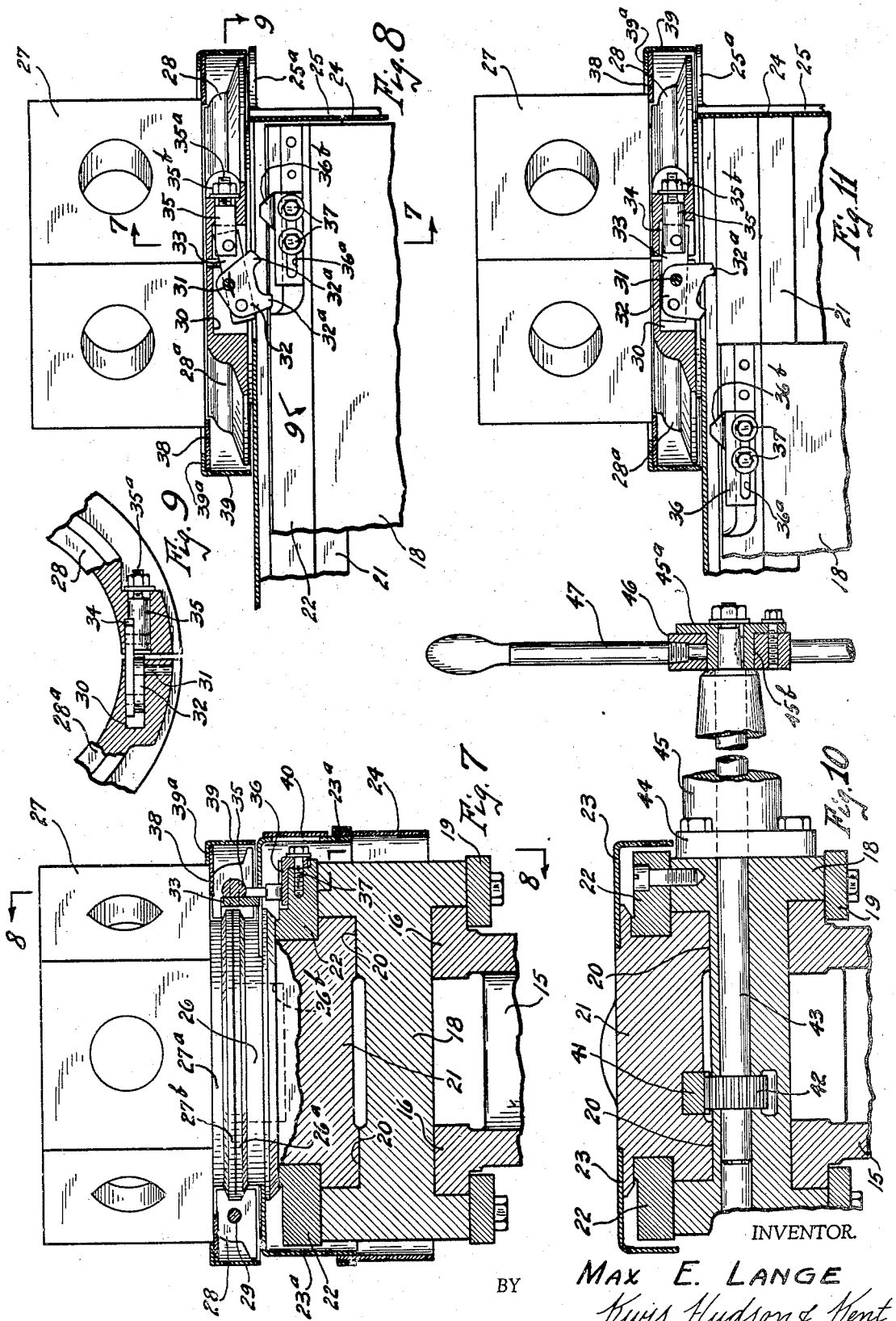

Patented Apr. 18, 1939

2,154,514

UNITED STATES PATENT OFFICE 2,154,514

MACHINE TOOL

Max E. Lange, Cleveland Heights, Ohio, assignor to The Warner & Swasey Company, Cleveland, Ohio, a corporation of Ohio Application July 24, 1937, Serial No. 155,453

16 Claims. (Cl. 29—46)

This invention relates to a machine tool of the type having a bed on which is an adjustable base carrying a slide that has an indexible member.

An object of the invention is to provide, in a machine tool that has a slide movable on a stationary or adjustable base and which is provided with an indexible member, improved means for protecting the ways of the base and also for protecting the relatively movable parts and bearing surfaces of the indexible member against dirt, chips, or other foreign matter to reduce the wear on such parts and surfaces.

Another object is to provide in a machine tool of the type specified means for protecting the binding surfaces of the clamp for the indexible member to exclude dirt, chips, or other foreign matter from said surfaces and to thereby reduce wear between said surfaces.

A further object is to provide in a machine tool of the type specified improved and adjustable means for varying the point at which the indexible member will be clamped and unclamped during the movement of the slide.

Another object is to provide in a machine tool of the character specified an adjustable turnstile for moving the slide and which can be so positioned that one of the handle spokes thereof will be located within convenient reach of the operator when the slide has reached its most rearward position.

Further and additional objects and advantages not hereinbefore specified will become apparent hereinafter during a detailed description of an embodiment of the invention which is to follow and which is illustrated in the accompanying drawings wherein:

Fig. 1 is a front elevational view of a portion of a machine tool, which in this instance is a turret lathe;

Fig. 2 is a top plan view of the portion of the machine tool shown in Fig. 1;

Fig. 3 is a top plan view on a larger scale of the indexible member and slide shown in Figs. 1 and 2 with portions of the indexible member, the guard therefor and the spokes of the turnstile broken away;

Fig. 4 is a detached fragmentary front elevational view of the turnstile;

Fig. 5 is a view partly in elevation and partly in section and is taken substantially on the line 5—5 of Fig. 1 looking in the direction of the arrows with a portion of the turnstile support broken away;

Fig. 6 is a front elevational view on a larger scale of the bed, the base, the slide, and the indexible member shown in Fig. 1, with the binder and the binder guards of the indexible member and the turnstile shown in section, the section through the binder and the binder guards being taken substantially on line 6—6 of Fig. 3, looking in the direction of the arrows;

Fig. 7 is a fragmentary transverse sectional view through the bed, the base, the slide, and the binder of the indexible turret with the turret shown in elevation and is taken along the line 7—7 of Fig. 8 looking in the direction of the arrows;

Fig. 8 is a fragmentary rear elevational view with certain parts in section, taken along the irregular line 8—8 of Fig. 7 looking in the direction of the arrows;

Fig. 9 is a fragmentary sectional view taken along the irregular line 9—9 of Fig. 8 looking in the direction of the arrows;

Fig. 10 is a transverse sectional view taken substantially on line 10—10 of Fig. 3 with a portion of the turnstile support broken away and looking in the direction of the arrows; and Fig. 11 is a view similar to Fig. 8 but showing the parts in a different relationship.

Referring to the drawings, it will be seen that the machine tool illustrated therein comprises a bed 15 provided with ways 16 and terminating at its left-hand end as viewed in the drawings in the headstock 17 in which is rotatably mounted the work spindle, as will be readily understood. A turret base 18 is mounted on the ways 16 of the bed for adjustable movement therealong and said base can be clamped in adjusted position upon the ways 16 by means of clamp strips 19 carried by the base and engaging beneath the ways. It will be understood that the base is made adjustable on the bed so as to take care of long or short work. The base 18 is provided with parallel longitudinally extending ways 20 at its opposite sides (see Figs. 7 and 10) and upon which ways is mounted the slide 21, as will be well understood.

The slide 21 is held in position on the ways of the base by means of guide strips 22 as is conventional in structures of this character. It will be appreciated that in the operation of a machine such as illustrated herein, chips, dirt and other foreign matter are liable to get upon the ways of the base with the result that the sliding movement of the slide thereon will cause the bearing and guide surfaces of the ways to wear, wherefore the movement of the slide upon the ways will not be true and it will be necessary to remachine the ways to bring the same into a condition such that the slide will move truly parallel to the axis of the work spindle.

In order to prevent such dirt, chips and other matter getting upon the ways of the base the slide 21 along its longitudinal edges and at its front and rear sides, as viewed in Fig. 2, is provided with angular guard strips 23, one arm of which extends horizontally and is secured to the upper side of the slide while the other arm extends substantially vertically downwardly at each side of the guide strips 22 which are fastened to the base, as clearly shown in Fig. 10. The guard strips 23 adjacent their left-hand ends, as viewed in the drawings, are provided with portions 23a that extend downwardly of the base a greater distance than do the remainder of the vertical arms of the guard strips, as clearly shown in Figs. 6 and 7.

A substantially U-shaped guard member 24 is secured to the lower edge of the portions 23a and extends across the end of the slide that is adjacent to the headstock. This guard member 24 will protect the end of the ways of the base when the slide is in a forward position or in its most rearward position. This guard member 24 is also of particular importance due to the fact that it is located in a position beneath the cutting tools supported upon the face of the turret where there is the greatest danger of chips and dirt getting on the ways from the cutting action of the tools. The same condition of course does not exist at the opposite end of the slide since no cutting action takes place adjacent such end.

The end or base of the U-shaped guard member 24 is secured to and reenforced by a heavier guard plate 25 which extends vertically of the end of the slide and is provided at its upper edge with a right angled arcuate portion 25a that underlies the guard for the binder of the indexible member, as clearly shown in Fig. 6, and forms with said guard for the binder an enclosing housing therefor, as will later be pointed out.

The slide 21 adjacent its left hand end, as viewed in the drawings, is provided with an upstanding circular portion 26 that has at its upper end a flange provided with a machined conical surface 26a. The portion 26 is provided with a centrally disposed bearing opening, 26b. The indexible turret 27 is provided on its underside with a centrally disposed circular portion 27a, that has at its lower end an annular flange 27b provided on its upper side with a machined conical surface and cooperating with the flange 26a of the slide, the two machined conical surfaces of the flanges forming together a double conical surface with which the clamping ring, later to be referred to, cooperates to clamp or bind the turret onto the slide. The portion 27a of the turret 27 is provided on its underside with a centrally disposed extension that projects into the bearing opening 26b in the slide and forms the pivotal mounting of the indexible turret. The structure just described is conventional in the art and it will be understood that suitable means are provided to prevent the uplifting or raising of the turret. It will also be understood that suitable means are provided for indexing the turret and for locking the same in its different indexed positions.

The turret 27 is clamped to the slide by means of a clamping ring formed of two separate parts 28 and 28a which are provided with a double conical groove cooperating with the double conical surface of the flanges 26a and 27b. The two parts 28 and 28a of the clamping ring are adjustably connected together adjacent to the front of the machine by a bolt connection 29, while adjacent to the rear of the machine the two parts of the clamping ring are connected together by a toggle mechanism now to be described.

The part 28a of the clamping ring at the rear side of the machine is provided with a recess, such as the milled slot 30, into which recess projects a fixed pin 31 that forms the pivotal mounting of a rockable dog 32, which is provided with extended fingers 32a, later to be referred to. The dog 32 is pivotally connected to one end of a link 33, the opposite end of which extends into a milled slot 34 in the part 28 of the clamping ring. This last mentioned end of the link 33 is pivotally connected to the end of a short shaft 35, that has a threaded extension 35a that receives a holding and adjusting nut 35b, it being noted that the shaft 35 can be moved endwise by the nut 35b, so as to vary the space between the two parts of the clamping ring when the link is in the position shown in Fig. 8, at which time the clamping ring has been expanded or spread apart to a non-clamping position and the turret is free to be indexed.

The rear guide strip 22, which is bolted to the base, is provided with a milled or rabbeted portion in which is mounted a short angle bar 36 that is adjustably secured in position by means of headed bolts 37 that extend through an elongated slot 36a formed in the vertically extending arm of the bar 36 and which are screwed into the guide strip 22. The horizontal arm of the bar 36 is provided with an upstanding cam lug 36b, the opposite edges of which are beveled or tapered for cooperation with the extended fingers 32a of the dog 32.

In Fig. 8 the turret is in its most rearward position where it has been indexed and locked but not clamped, the clamping ring still being in the expanded or non-clamping position. When the slide moves toward a working position, that is, toward the right, as viewed in Fig. 8, the right hand extended finger 32a of the dog 32, will pass over the cam lug 36b, while the left hand extended finger 32a will contact the lug 36b and the dog 32 will be rocked from the position shown in Fig. 8 to the position shown in Fig. 11. This rocking movement of the dog will move the link 33 upwardly above its pivotal connection to the bolt 35, until the axis of the pivotal connection between the link 33 and the dog 32 lies above the axes of the pin 31 and the pivotal connection between the link and the bolt 35, at which time the two parts of the clamping ring will have been drawn together due to the toggle action and the turret clamped in position. When the slide moves rearwardly from a working position to a position in which the turret is to be indexed, that is, moves toward the left as viewed in Fig. 11, the right hand extended finger 32a of the dog 32 will contact with the lug 36b and the dog 32 will be rocked in a direction such as to swing the link 33 downwardly from the position shown in Fig. 11, to the position shown in Fig. 8, wherefore, the pulling action of the toggle is released and the two parts of the clamping ring permitted to spread apart to allow the turret to be indexed. It will be seen that the angle bar 36 can be adjusted to the right or to the left by loosening the bolts 37 and then clamped in its adjusted position, wherefore the point in the movement of the slide at which the clamping ring will be contracted or expanded to clamp or unclamp the turret can be delayed or advanced to meet different operating conditions.

Secured to the underside of the turret 27 adjacent its periphery and in such position as to overlie the clamping ring is an annular guard ring 38 as clearly shown in Fig. 7 and also in Fig. 6. An annular ring-like guard member 39 is provided at its upper end with an inturned horizontal flange 39a that engages over and is secured to the upper side of the guard ring 38, said guard member 39 extending downwardly around the outer side of the clamping ring and forming with the guard ring 38, the portion 25a of the guard plate 25, and the upper surface of the guard strips 23 and the slide 21 an enclosing housing which guards or protects the clamping ring and the mechanism for operating the same from the entrance of chips, dirt and other foreign matter which would tend to hinder the operation of such mechanism and would produce wear upon the cooperating surfaces of the clamping ring and of the flanges 26a and 27b. The portion 23a of the guard strip 23 at the rear of the machine is provided with an opening affording access to the screws 37 which hold the bar 36 in adjusted position and in order to cover this opening a guard plate 40 is secured over the opening and to the portion 23a of the guard strip 23, see Fig. 7.

The slide 21 is moved along the ways of the base by means of a rack 41 fixed to the underside of the slide and meshing with a pinion 42 that is fixed to or integral with a shaft 43 rotatably mounted in the base 18 and extended forwardly thereof into a supporting bracket 44 secured to the front of the base and having a bar-like extension 45. A turnstile hub is keyed to the shaft 43 outwardly of base 45, and is provided at its outer end with a disc flange 45a, while adjacent to said flange and inwardly thereof the hub has an annular groove 45b. A ring 46 provided with radially projecting spokes or handles 47, is freely rotatable in the annular groove 45b in the hub. The disc 45a of the hub is provided with a plurality of circumferentially spaced arcuate slots 48 through which extend headed bolts 49 which screw into the ring 46. It will be seen that the ring 46 can be adjusted so that the spokes or handles 47 can be variously positioned relative to the disc 45a by rotating the ring 46 within the limits of the length of the arcuate slots 48 and then clamped to rotate with the disc 45a and the hub by means of the bolts 49.

In the drawings the turnstile is illustrated as being provided with four equally spaced handles or spokes 47. When the slide is in its most rearward position a handle or spoke 47 of the turnstile should be in a substantially vertical position (see Fig. 1) within convenient reach of the operator, so that the latter will not have to look in reaching for the handle to effect a forward movement of the slide. Inasmuch as the ring 46 which carries the handles can be adjusted relative to the disc 45a it will always be possible to have one of the handles or spokes 47 of the turnstile in this substantially vertical position.

From the foregoing description, it will be seen that the bearing and guide surfaces of the slide and base are fully protected against the entrance of dirt, chips and other foreign matter and particularly at those portions of said surfaces which would be most liable to receive chips if the same were not excluded. In addition, it will be seen that the binding and bearing surfaces between the indexible turret and the slide, as well as the mechanism for clamping the turret to the slide are also fully protected against the entrance of dirt and chips by an enclosing guard housing. Furthermore, it will be noted that the position in the movement of the slide in which the turret is unclamped and clamped can be readily advanced or delayed to meet different operating conditions. Additionally, it will be seen that the turnstile can be quickly adjusted, so that a handle or spoke thereof will lie in a substantially vertical position when the slide is in its most rearward position.

Although a preferred embodiment of the invention has been illustrated and described herein, it will be understood that the invention is susceptible of various modifications and adaptations within the scope of the appended claims.

Having thus described my invention, I claim:

1. In a machine tool having a bed provided with ways, an adjustable base mounted on said ways and provided with ways, and a slide movable on said second named ways; a guard carried by said slide and overhanging and protecting said second named ways against the entrance of dirt, chips and other foreign matter.

2. In a machine tool having a bed, an adjustable base mounted on said bed and provided with ways, and a slide movable on said ways; a guard carried by said slide and extending along the opposite longitudinal edges and across one end thereof to protect said ways against dirt, chips and other foreign matter.

3. In a machine tool having a bed, an adjustable base mounted on said bed and provided with ways, and a slide movable on said ways; a guard carried by said slide and projecting downwardly from the sides thereof and protecting said ways against dirt, chips and other foreign matter.

4. In a machine tool having a bed, an adjustable base mounted on said bed and provided with ways, and a slide movable on said ways; a substantially U-shaped guard member carried by said slide and projecting downwardly of the two sides and one end thereof and protecting said ways against the entrance of dirt, chips and other foreign matter.

5. In a machine tool having a bed, an adjustable base mounted on said bed and provided with ways, and a slide movable on said ways; a guard carried by said slide and including a U-shaped downwardly extending skirt-like portion protecting said ways and said base at both sides and one end of the slide against the entrance of dirt, chips and other foreign matter.

6. In a machine tool having an indexible turret, external mechanism for clamping said turret and means for actuating said mechanism; a guard carried by said turret and overlying and protecting said mechanism and said means against the entrance of dirt, chips and other foreign matter.

7. In a machine tool having an indexible turret, external mechanism for clamping said turret and means for actuating said mechanism; a guard carried by said turret and extending downwardly therefrom and around said mechanism and said means and protecting the same against chips, dirt and other foreign matter.

8. In a machine tool having an indexible turret, a binder therefor, and mechanism for operating said binder; a guard for said binder and said mechanism carried by said turret and protecting said binder and mechanism against the entrance of chips, dirt and other foreign matter.

9. In a machine tool having a base provided with ways, a slide movable on said ways and provided with an indexible turret, a binder for said turret, and mechanism for operating said binder; a guard for said ways carried by said slide and including at one end of said slide a portion having a laterally and horizontally extending flange underlying a portion of said binder, and a guard for said binder and said mechanism carried by said turret, said last named guard cooperating with said flange, said guards excluding dirt, chips and other foreign matter from said ways, binder and mechanism.

10. In a machine tool having a base provided with ways, a slide movable on said ways and having an indexible turret, a binder for said turret, and mechanism for operating said binder; a substantially U-shaped guard for said ways carried by said slide, and a guard for said binder and mechanism and carried by said turret, said first named guard having portions cooperating with the second named guard to form an enclosing housing excluding chips, dirt and other foreign matter from said binder and mechanism.

11. In a machine tool having an indexible turret, an external binder therefor and mechanism for actuating said binder; a guard member for said binder and mechanism carried by said turret and excluding chips, dust and other foreign matter from said binder and mechanism.

12. In a machine tool having a bed, a base adjustable thereon and provided with ways, and a slide movable on said ways; a guard for said ways including angle strips secured to the opposite sides of said slide and extending longitudinally and downwardly thereof, and a substantially U-shaped member secured to said angle strips and extending around one end of said slide.

13. In a machine tool having a base provided with ways, a slide movable on said ways and having an indexible turret, a binder for said turret, and mechanism for operating said binder; a guard for said ways including elongated angle strips secured to said slide at its opposite sides and projecting downwardly thereof, a substantially U-shaped member secured to said angle strips and extending around an end of said slide, and a plate secured to said member at the end of said slide and having a laterally and horizontally extending flange, and a guard member for said binder and said mechanism carried by said turret and cooperating with said flange of said plate to form an enclosure for said binder, said guards excluding chips, dirt and other foreign matter from said ways, binder and mechanism.

14. In a machine tool having a bed, an adjustable base mounted thereon, a slide on said base and provided with an indexible turret and a binder for said turret; mechanism for operating said binder and including means mounted on said base and adjustable to vary the point in the movement of the slide at which said binder is actuated to clamp or unclamp the turret.

15. In a machine tool having a base, a slide movable thereon and provided with an indexible turret, a binder for said turret and mechanism for actuating said binder, said mechanism including toggle means carried by said binder, and an adjustable abutment cooperating with said toggle means and carried by said base whereby the point in the movement of the slide at which said binder is actuated can be varied.

16. In a machine tool having a base, a slide movable thereon, mechanism for operating said slide and including a rotatable actuating shaft, and a turnstile for rotating said shaft and including a hub keyed thereto and provided with a flange at its end, a handle supporting ring rotatably mounted on said hub adjacent said flange, and means for adjustably interconnecting said flange and said ring to cause the same to rotate together in adjusted position and including a slot formed in one of said elements and a bolt carried by the other of said elements.

MAX E. LANGE.